June 24, 1969

D. W. BARTON ETAL 3,451,288

REDUNDANT SUPPORT FOR BRAKE PEDAL

Filed Dec. 8, 1967

INVENTORS
DAVID W. BARTON
RICHARD G. RUSSELL
BY
John R. Faulkner
Clifford L. Sadler
ATTORNEYS United States Patent Office 3,451,288
Patented June 24, 1969

3,451,288
REDUNDANT SUPPORT FOR BRAKE PEDAL
David W. Barton, Birmingham, and Richard G. Russell, Dearborn, Mich., assignors to Ford Motor Company, Dearborn, Mich., a corporation of Delaware
Filed Dec. 8, 1967, Ser. No. 689,134
Int. Cl. G05g 1/14
U.S. Cl. 74—512                             9 Claims

ABSTRACT OF THE DISCLOSURE

A pivot support for a motor vehicle brake pedal having concentric first and second pivot pins. A pair of flexible retainers engages the ends of the pivot pins and by means of a snap action connects the pins to a support member.

Background of the invention

The present invention is particularly directed to a redundant support for a brake pedal. The present invention is also directed to the problem of providing a pedal support structure that may be easily assembled during production and thereby eliminate assembly line problems.

Brief summary of the disclosure

In the presently preferred embodiment of this invention, a depending brake pedal is supported by inner and outer concentric pivot pins. Each of the pivot pins has an enlarged head that engages an annular plastic member. The plastic members grip the heads and encircles the shanks of the pivot pins. They are designed for snap action attachment with the supporting sheet metal for the brake pedal. This structure provides dual pivot pins for redundancy and a snap retainer for easy assembly.

Brief description of the drawing

The many objects and advantages of the present invention will become apparent upon consideration of the following detailed discussion and the accompanying drawings in which.

Detailed description of the invention

Figure 1:
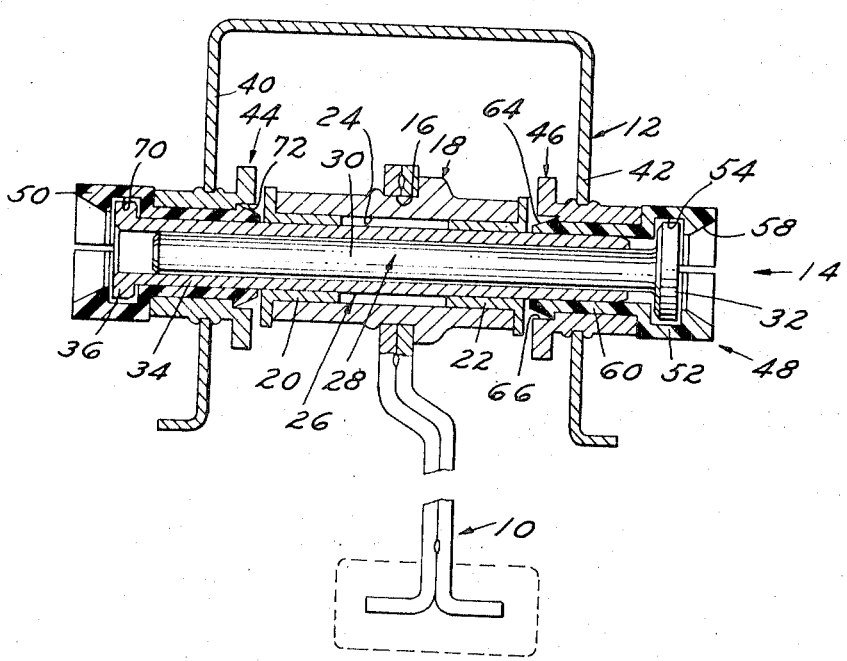
FIG. 1 is an elevational view in section of a brake pedal means constructed in accordance with this invention.

Referring now to the drawings for a detailed description of the invention, FIG. 1 discloses a brake pedal 10 for use in a motor vehicle that is pivotally connected to sheet metal support structure 12. The structure 12 comprises a channel-shaped member extending between the firewall and the instrument panel of the vehicle. The pedal 10 is pivotally connected to the sheet metal 12 by a pivot structure 14 which will be described below.

The upper end of the depending arm of the pedal 10 is provided with an opening 16 through which a tubular member 18 is passed. The metal of the member 18 is upset in a cold forging operation to clamp it to the pedal 10. A pair of hat-shaped bushings 20 and 22 fit within the ends of the central opening 24 of the tubular member 18.

Concentric inner and outer pivot pins 26 and 28 are positioned within the bushings 20 and 22. The inner pivot pin 28 has a solid shank 30 with an enlarged flat head 32. The outer pin 26 has a tubular shank 34 that surrounds the shank 30 of the pin 28. It is provided with an enlarged head 36.

As illustrated in FIG. 1, the tubular pivot pin 26 fits over the solid pivot pin 28 so that the enlarged heads 36 and 32 are located at opposite ends of the assembled pins. The hat-shaped bushings 20 and 22 are in sliding bearing engagement with the exterior surface of the outer tubular pin 26.

Means are provided for mounting the pivot pins 26 and 28 upon the sheet metal support member 12. The member 12 has spaced apart parallel side flanges 40 and 42 with aligned openings that receive hat-shaped support elements 44 and 46. A combination bearing and pivot pin retainer 48 connects the inner pivot pin 28 to the right-hand support element 46. An identical bearing-retainer 50 connects the head 36 of the outer pin 26 to the support member 44.

Figure 2:
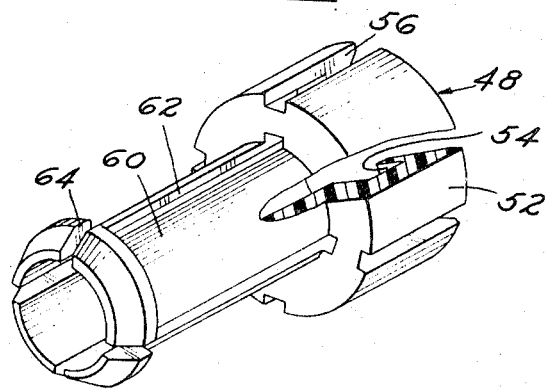
FIG. 2 is a perspective view of the pivot pin retainer used in FIG. 1.

The combination bearing and pin retainer 48 is illustrated in perspective in FIG. 2. The retainer 48 is formed from a plastic having some elastic deformability. It is noted from the drawings that the member 48 is of generally annular configuration with a head portion 52 having an internal groove 54. The head 52 has spaced apart slots 56 so as to provide radially flexible segments. As noted in FIG. 1, the entrance to the central opening of the member 48 is sloped at 58 so that member 48 may be slipped along the shank 30 of the pivot pin 28 and then snapped over the head 32 with the head 32 seated in the groove 54. The body section 60 of the bearing-retainer 48 is of reduced outside diameter as compared with the head portion 52. The internal surface of the body portion 60 engages the exterior surface of the tubular pin 26.

The body portion is also provided with longitudinal slots 62 that form four spaced apart flexible segments as seen in FIG. 2. The inner end of the body section 60 has a raised radial end portion 64 that is adapted to engage a circumferential recess or undercut 66 formed in the support element 46. Minimum clearance is provided so that the plastic member 48 may be jammed through the opening 68 in the bearing 46 with the raised portion 64 being locked in the recess 66. The shoulder formed at the juncture of the head portion 52 and the body section 60 engages the outer end of the support element 46. This locks the retainer 48 in axial position.

In an identical fashion, the plastic retainer 50 locks the head 36 in an internal groove 70 and snaps into engagement with an annular recess 72 in the bearing 44. It is to be noted that the inner ends of the members 48 and 50 are closely spaced with respect to the hat-shaped bushings 20 and 22 in order to stabilize the lateral position of the brake pedal 10.

In accordance with the presently preferred embodiment, the retainers 48 and 50 serve the dual function of supporting the adjacent ends of the pivot pins 26 and 28 on the support member 12 and, in addition, of providing an assembly in which the components may be snapped together in permanent engagement. It will be noted that the assembly does not require any threaded fasteners. In addition, the invention provides a redundant support for the pedal 10 in that the pivot pins 26 and 28 overlap.

The foregoing description presents the presently preferred embodiment of this invention. Modifications and alterations may occur to those skilled in the art that will come within the scope and spirit of the following claims.

We claim:

1. A control pedal support comprising a pedal, a pedal support member and connecting means pivotally connecting said pedal to said member, said connecting means comprising pivot pin means having a shank portion, means connecting said pedal to said shank portion, a deformable retaining member engaging one end of said pivot pin means, and support member having at least one opening, said pivot pin means extending through said opening, said retaining member being positioned in said opening and having portions on both sides thereof that are of greater size than said opening.

2. A control pedal support according to claim 1 and including:
said pivot pin means having an enlarged head portion, said deformable retaining member surrounding one end of said pivot pin means and having an internal groove in which said head portion is seated.

3. A control pedal support according to claim 1 and including:

said pivot pin means having an enlarged head portion, said deformable retaining member having a body section surrounding one end of said pivot pin means, said retaining member also having a head section with an internal groove in which said head portion of said pivot pin means is seated, said head section being of greater external size than said body section.

4. A control pedal support according to claim 1 and including:

said pivot pin means having an enlarged head portion at each of its ends, said deformable retaining member engaging one of said head portions, a second deformable retaining member engaging the other of said head portions, both of said retaining members being connected to said support member.

5. A control pedal support comprising a pedal, a pedal support member and connecting means pivotally connecting said pedal to said member, said connecting means comprising a first pivot pin having a shank portion, a second pivot pin having a tubular shank portion, said first mentioned shank portion being positioned within said tubular shank portion, means connecting said pedal to one of said pivot pins, first retaining means engaging one of said pivot pins and connecting said one pin to said support member, second retaining means engaging the other of said pivot pins and connecting it to said support member.

6. A control pedal support according to claim 5 and including:

said first pivot pin having an enlarged head portion, said first retaining means comprising a first deformable retaining member surrounding one end of said tubular shank portion and having an internal groove positioned about said enlarged head portion of said first pivot pin, said pedal support member having an opening axially aligned with said pivot pins, said first retaining member being positioned within said opening and having a radially extending portion preventing its withdrawal.

7. A control pedal support according to claim 5 and including:

said first retaining means comprising a first deformable retaining member surrounding one end of said tubular shank portion, said second retaining means comprising a second deformable retaining member identical in construction to said first retaining member, said second retaining member surrounding the other end of said tubular shank portion, said pedal support member having openings axially aligned with said pivot pins, said retaining members being positioned within said openings and having radially extending portions preventing their withdrawal.

8. A control pedal support according to claim 5 and including:

said first pivot pin having a head portion, said second pivot pin having a head portion, said first retaining means comprising a first deformable retaining member surrounding one end of said tubular shank portion and having an internal groove positioned about the enlarged head portion of said first pivot pin, said second retaining means comprising a second deformable retaining member identical in construction to said first retaining member, said second retaining member surrounding the other end of said tubular shank portion and having a groove therein receiving said head portion of said second pivot pin.

9. A control pedal support according to claim 5 and including:

said first pivot pin having an enlarged head portion, said second pivot pin having an enlarged head portion, bearing means pivotally mounting said pedal on said tubular shank portion, said first retaining means comprising a first deformable retaining member surrounding one end of said tubular shank portion and having an internal groove positioned about the enlarged head portion of said first pivot pin, said second retaining means comprising a second deformable retaining member identical in construction to said first retaining member, said second retaining member surrounding the other end of said tubular shank portion and having a groove therein receiving said head portion of said second pivot pin, said pedal support member having openings axially aligned with said pivot pins, said retaining members being positioned within said openings and having radially extending portions preventing their withdrawal.

References Cited

UNITED STATES PATENTS

| 892,935 | 7/1908 | Cataldo | 74—594.1 |
| 3,299,737 | 1/1967 | Hurlin | 308—15 |
| 3,331,642 | 7/1967 | Krauss | 287—93 |

FRED C. MATTERN, Jr., *Primary Examiner.*

F. D. SHOEMAKER, *Assistant Examiner.*